US012416998B2

United States Patent
Oshita et al.

(10) Patent No.: US 12,416,998 B2
(45) Date of Patent: Sep. 16, 2025

(54) ELECTROSTATIC INPUT DEVICE

(71) Applicant: ALPS ALPINE CO., LTD., Tokyo (JP)

(72) Inventors: Kazuhito Oshita, Miyagi (JP); Daisuke Takai, Tokyo (JP); Toshiki Nakamura, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/756,241

(22) Filed: Jun. 27, 2024

(65) Prior Publication Data

US 2024/0345688 A1 Oct. 17, 2024

Related U.S. Application Data

(63) Continuation of application No. PCT/JP2022/046332, filed on Dec. 16, 2022.

(30) Foreign Application Priority Data

Jan. 4, 2022 (JP) .................................. 2022-000281

(51) Int. Cl.
  *G06F 3/044* (2006.01)
  *G06F 3/041* (2006.01)
(52) U.S. Cl.
  CPC ............ *G06F 3/044* (2013.01); *G06F 3/0416* (2013.01)
(58) Field of Classification Search
  CPC ........ G06F 3/044; G06F 3/0416; G06F 3/041; G01V 3/08; H01H 36/00
  See application file for complete search history.

(56) References Cited

U.S. PATENT DOCUMENTS

| 2004/0130527 | A1  | 7/2004 | Endo et al. |
| 2005/0068712 | A1* | 3/2005 | Schulz ................. H03K 17/955 |
| | | | 361/287 |
| 2011/0221452 | A1  | 9/2011 | Shyue |
| 2016/0124576 | A1* | 5/2016 | Besshi ................ G06F 3/04166 |
| | | | 345/174 |
| 2016/0139285 | A1* | 5/2016 | Tsuji ........................ G01V 3/08 |
| | | | 324/679 |

(Continued)

FOREIGN PATENT DOCUMENTS

| JP | 2004-212394 | 7/2004 |
| JP | 2012-084453 | 4/2012 |

(Continued)

OTHER PUBLICATIONS

International Search Report for PCT/JP2022/046332 mailed on Feb. 14, 2023.

*Primary Examiner* — Hong Zhou
(74) *Attorney, Agent, or Firm* — IPUSA, PLLC

(57) ABSTRACT

An electrostatic input device includes a capacitance detector that is disposed at an operation part to be operated by a living body, and is configured to detect capacitance; and a controller that is formed of an integrated circuit, and is configured to transition the capacitance detector to an activated state in response to an increment in the capacitance detected by the capacitance detector reaching or exceeding a first predetermined value a predetermined number of times or more within a predetermined period in a case in which the capacitance detector is in a standby state and no contact with the living body is detected.

13 Claims, 12 Drawing Sheets

(56) References Cited

U.S. PATENT DOCUMENTS

| | | | |
|---|---|---|---|
| 2017/0131829 A1 | 5/2017 | Takahashi et al. | |
| 2018/0012431 A1* | 1/2018 | Murphy | E05F 15/73 |
| 2018/0239456 A1* | 8/2018 | Sawada | H03K 17/955 |
| 2020/0181953 A1* | 6/2020 | Oshita | H01H 36/00 |
| 2021/0382577 A1* | 12/2021 | Imai | G06F 3/0488 |
| 2022/0057874 A1* | 2/2022 | Yamada | H03K 17/962 |
| 2022/0205285 A1* | 6/2022 | Escalante | G07C 9/00174 |

FOREIGN PATENT DOCUMENTS

| | | | | |
|---|---|---|---|---|
| JP | 2014-142753 | | 8/2014 | |
| JP | 2017-091224 | | 5/2017 | |
| WO | WO-2020235192 A1 | * | 11/2020 | G01B 7/00 |

\* cited by examiner

FIG.4
NORMAL MODE
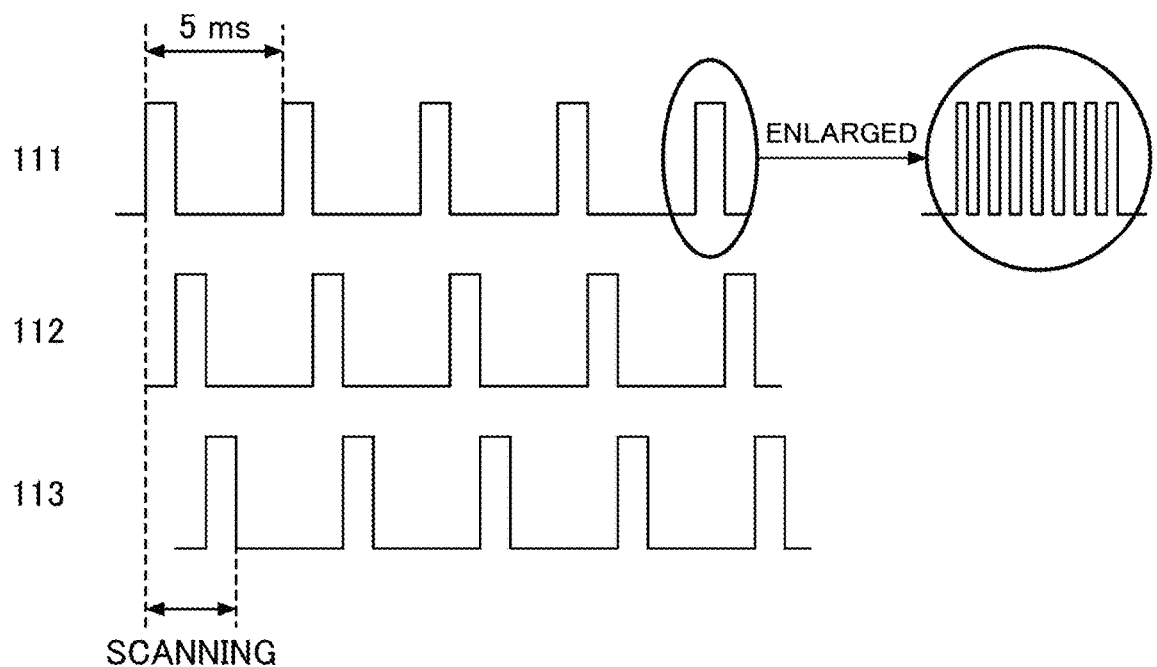
POWER SAVING MODE
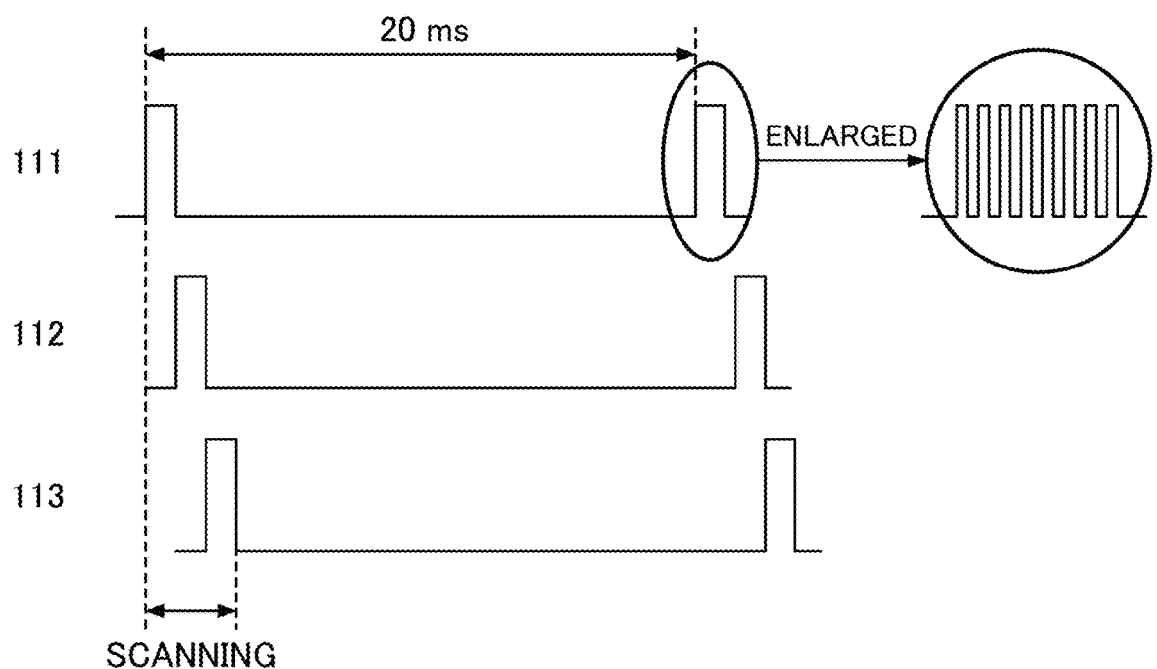

ELECTROSTATIC INPUT DEVICE

CROSS-REFERENCE TO RELATED APPLICATIONS

This application is a continuation application of International Application No. PCT/JP2022/046332, filed on Dec. 16, 2022, and designated the U.S., which is based upon and claims priority to Japanese Patent Application No. 2022-000281, filed on Jan. 4, 2022, the entire contents of which are incorporated herein by reference.

BACKGROUND

1. Field of the Invention

The present disclosure relates to electrostatic input devices.

2. Description of the Related Art

Driving methods of input means using a capacitance detector provided at an operation part are known. According to the known driving methods, for saving power, the capacitance detector is set to be in a standby state in the absence of contact with the operation part, and the capacitance detector is set to be in an activated state in the presence of contact with the operation part (see, for example, US2004/0130527 A1).

SUMMARY

An electrostatic input device according to an embodiment of the present disclosure includes: a capacitance detector that is disposed at an operation part to be operated by a living body, and is configured to detect capacitance; and a controller that is formed of an integrated circuit, and is configured to transition the capacitance detector to an activated state in response to an increment in the capacitance detected by the capacitance detector reaching or exceeding a first predetermined value a predetermined number of times or more within a predetermined period in a case in which the capacitance detector is in a standby state and no contact with the living body is detected.

BRIEF DESCRIPTION OF THE DRAWINGS

FIG. 4 is a diagram illustrating scanning intervals in a normal mode and a power saving mode;

DETAILED DESCRIPTION OF THE DISCLOSURE

Existing driving methods of input means aim to reach a determination threshold in a short time that determines the event of contact. However, they do not necessarily achieve a speed that is high enough, and there has been scope for improvement. One possible measure against this is to lower the determination threshold that determines the event of contact with the operation part. In such a case, however, there is a possibility of increase in false detection as a result of activation due to, for example, instantaneous noise in response to motions of a user.

In view of the above, the present disclosure provides an electrostatic input device that is capable of activating the capacitance detector in a state before determination of contact, and suppresses false detection.

Hereinafter, embodiments in which the electrostatic input device of the present disclosure is applied will be described.

Embodiments

Figure 1:
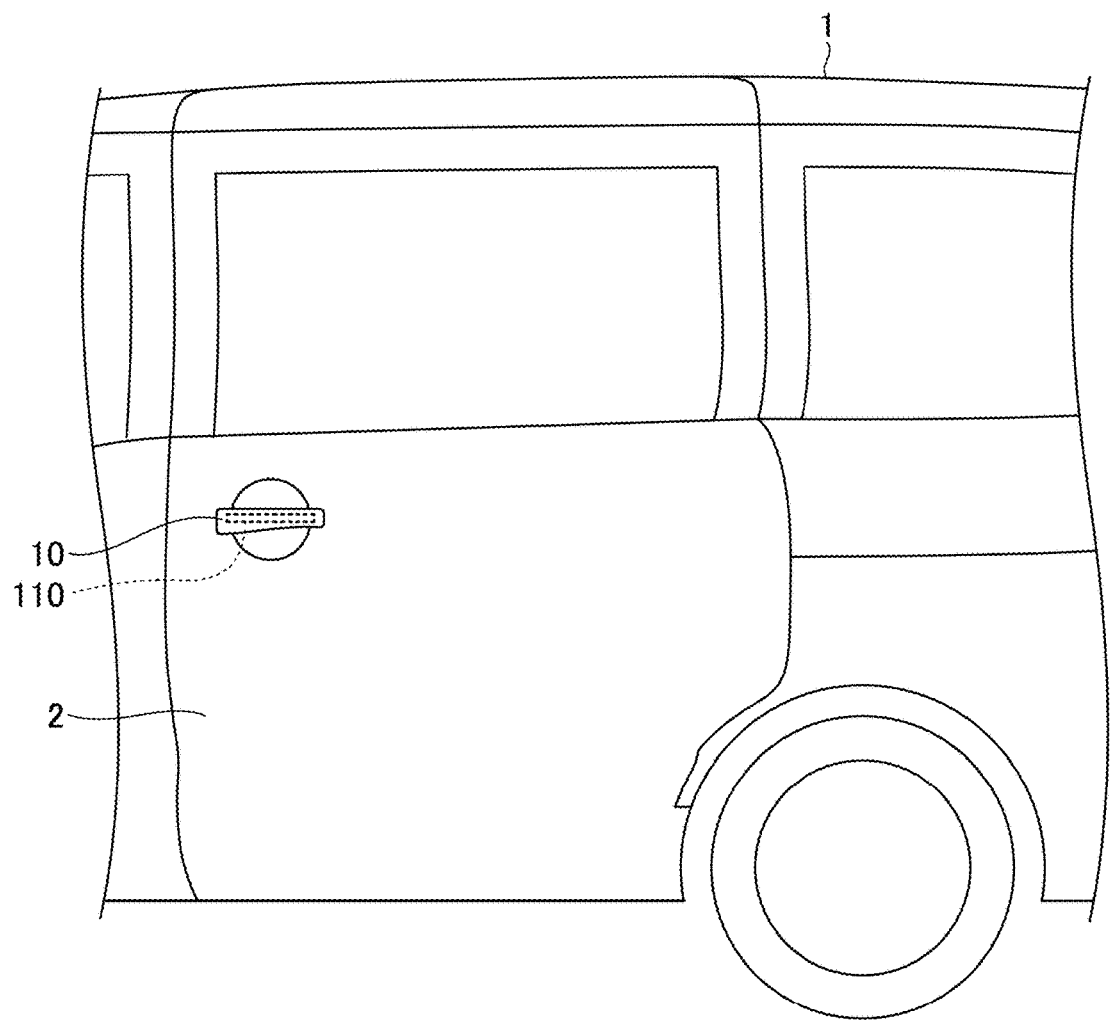
FIG. 1 is a diagram illustrating a door handle 10 attached to a vehicle 1.

FIG. 1 is a diagram illustrating the door handle 10 attached to the vehicle 1. The door handle 10 is attached to a door 2 of the vehicle 1. The door handle 10 has a thin and long shape so as to be readily grasped by fingers of a person's hand. The electrostatic sensor 110 is provided in the interior of the door handle 10. In FIG. 1, a longitudinal direction of the door handle 10 is a lateral direction in which the door handle 10 extends so as to be thin and long.

Figure 2:
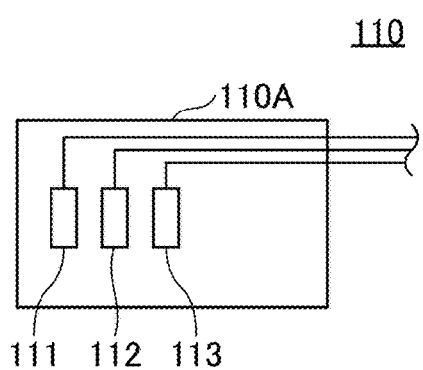
FIG. 2 is a diagram illustrating an electrostatic sensor 110.

FIG. 2 is a diagram illustrating the electrostatic sensor 110. The electrostatic sensor 110 includes a substrate 110A and the sensors 111, 112, and 113. In one example, the sensors 111, 112, and 113 are arranged along the longitudinal direction of the door handle 10. The electrostatic sensor 110 is an example of the capacitance detector.

Figure 3:
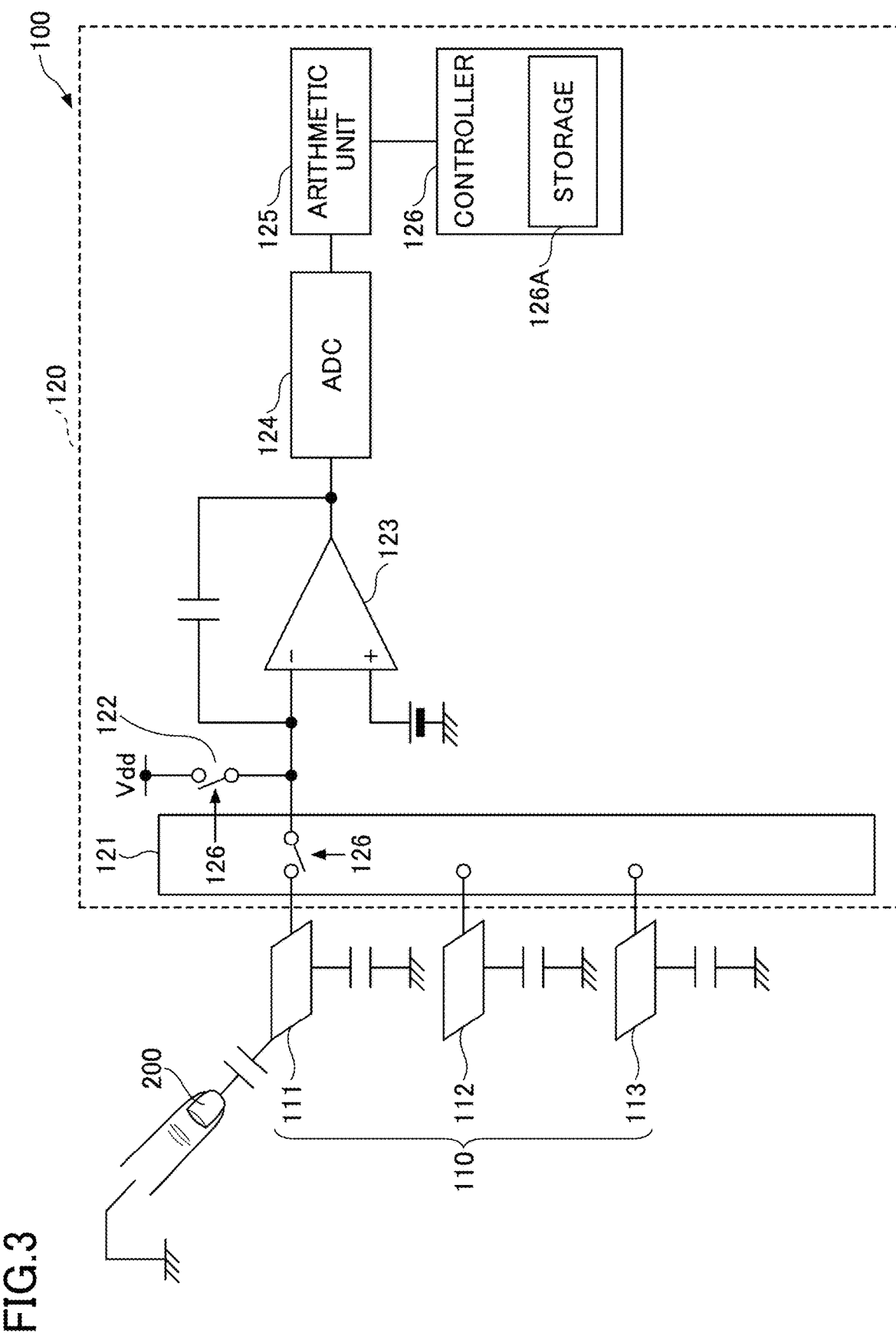
FIG. 3 is a diagram illustrating an electrostatic input device 100 of an embodiment.

FIG. 3 is a diagram illustrating the electrostatic input device 100 of the embodiment. The electrostatic input device 100 includes the electrostatic sensor 110 and an integrated circuit 120.

The integrated circuit 120 includes a switch 121, a switch 122, an amplifier 123, an ADC (Analog-to-digital converter: AD converter) 124, an arithmetic unit 125, and the controller 126. The controller 126 includes a storage 126A therein.

As illustrated in FIG. 3, the switch 121 of the integrated circuit 120 is connected to the sensors 111, 112, and 113 of the electrostatic sensor 110.

The switch 121 is provided between the sensors 111, 112, and 113 and an inverted input terminal of the amplifier 123. When the controller 126 switches a connection destination, the inverted input terminal of the amplifier 123 is connected to the sensor 111, 112, or 113. At a line branched from between the switch 121 and the inverted input terminal of the amplifier 123, a power supply Vdd is connected via the switch 122.

The switch 122 is provided for applying a pulse voltage (voltage value: Vdd) to the sensors 111, 112, and 113 sequentially. This is performed by the controller 126 intermittently switching on/off of the switch 122 in a state in which the switch 121 is connected to the sensors 111, 112, and 113.

In this manner, when the controller 126 switches the connection destination of the switch 121 and switches on/off of the switch 122, the pulse voltage is applied to the sensors 111, 112, and 113 sequentially. Applying the pulse voltage to the sensors 111, 112, and 113 is scanning the sensors 111, 112, and 113.

By scanning the sensors 111, 112, and 113 in this manner, the potentials detected by the sensors 111, 112, and 113 are amplified by the amplifier 123, and converted by the ADC 124 from analog signals to digital signals. Based on the converted digital signals, the arithmetic unit 125 can calculate the capacitance between the sensors 111, 112, and 113 and a finger 200. Information on the calculated capacitance is stored in the storage 126A of the controller 126. The controller 126 detects (determines) a user's approach to the door handle 10 in accordance with the information on the capacitance calculated by the arithmetic unit 125.

FIG. 4 is a diagram illustrating scanning intervals in the normal mode and the power saving mode. Here, the normal mode is a mode in which the electrostatic sensor 110 is activated at short time intervals and detects the contact with or proximity to the living body. The electrostatic sensor 110 in the normal mode is referred to as being in the activated state.

The power saving mode is a mode in which the electrostatic sensor 110 is in the standby state. In the standby state, the activation of the electrostatic sensor 110 is restricted. For example, by extending the scanning intervals or reducing the number of measurement pulses, the power consumed by the electrostatic sensor 110 and the integrated circuit 120 is set to be low. When a predetermined condition is fulfilled, the power saving mode is ended and transitioned to the normal mode, and the electrostatic sensor 110 is transitioned to the activated state from the standby state.

In the normal mode, as an example, the sensors 111, 112, and 113 are scanned at 5 ms intervals, and a pulse voltage is sequentially applied to the sensors 111, 112, and 113 at 5 ms intervals. As illustrated in FIG. 4, a single scanning time is a period for which the pulse voltage is applied to each of the sensors 111, 112, and 113 once.

More specifically, the pulse voltage applied every 5 ms includes eight pulses as an example, as illustrated in the right-hand enlarged view. The timings of the pulse voltage applied to the sensors 111, 112, and 113 every 5 ms are temporally shifted from each other.

The capacitance calculated by the arithmetic unit 125 in the single scanning process is an average value of eight capacitances obtained by application of eight pulses as illustrated in the enlarged view. That is, the number of times of measurement in the single scanning process is eight. Here, for simplifying the description, the number of times of measurement is set to be eight for the sake of convenience; however, in actual measurement, a larger number of times of measurement, e.g., 128 times, 256 times, or the like, may be set to obtain an average value. Conversely, a smaller number of times of measurement, e.g., less than eight times, such as once or the like, may be set.

In the power saving mode, as an example, the sensors 111, 112, and 113 are scanned at 20 ms intervals, and a pulse voltage is sequentially applied to the sensors 111, 112, and 113 at 20 ms intervals. More specifically, the pulse voltage applied every 20 ms includes eight pulses as an example, as illustrated in the right-hand enlarged view. The timings of the pulse voltage applied to the sensors 111, 112, and 113 every 20 ms are temporally shifted from each other.

Similar to the normal mode, a single scanning time is a period for which the pulse voltage is applied to each of the sensors 111, 112, and 113 once. The capacitance calculated by the arithmetic unit 125 in the single scanning process is an average value of eight capacitances obtained by application of eight pulses as illustrated in the enlarged view.

In this manner, the number of times in which the pulse voltage is applied to the sensors 111, 112, and 113 is reduced in the power saving mode compared to the normal mode. Thus, the power consumed by the integrated circuit 120 is also reduced, and the power consumed by the electrostatic input device 100 can be reduced as a whole.

In order to quickly activate the electrostatic sensor 110 from the power saving mode at an early stage before determination of approach, a possible way is to lower a threshold based on which the controller 126 detects (determines) the user's approach to the door handle 10 in accordance with the outputs of the sensors 111, 112, and 113, and activate the electrostatic sensor 110 at the time of detection.

However, in the state before the user's hand contacts the door handle 10, the outputs of the sensors 111, 112, and 113 may contain noise due to change in the relative position between the user and the door handle 10, disturbance noise, and the like. Even if filtering is performed by the controller 126, it is challenging to accurately detect (determine) the user's approach to the door handle 10.

Figure 5A:
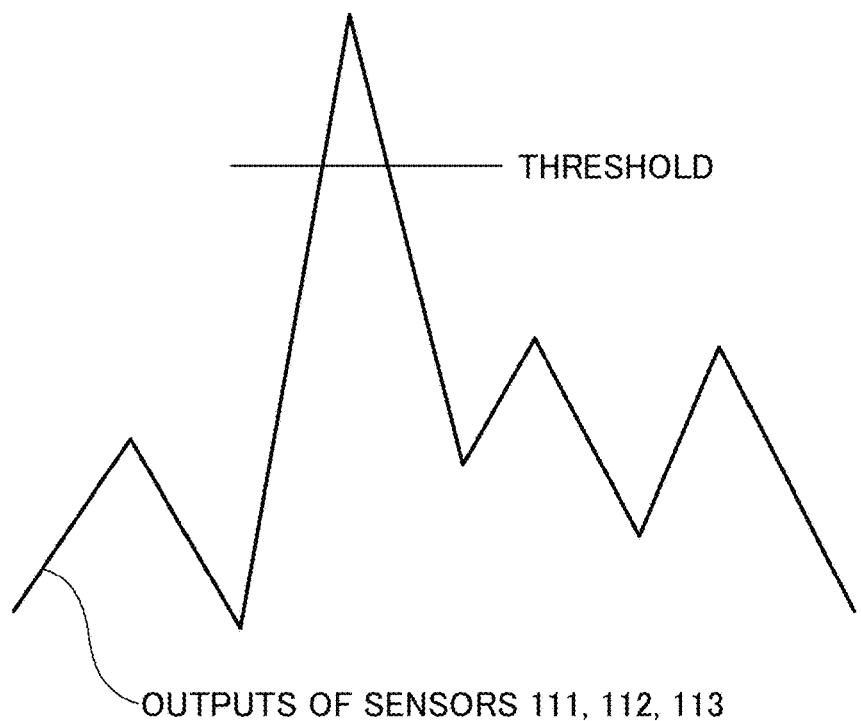
FIGS. 5A and 5B are diagrams illustrating outputs of sensors 111, 112, and 113.
Figure 5B:
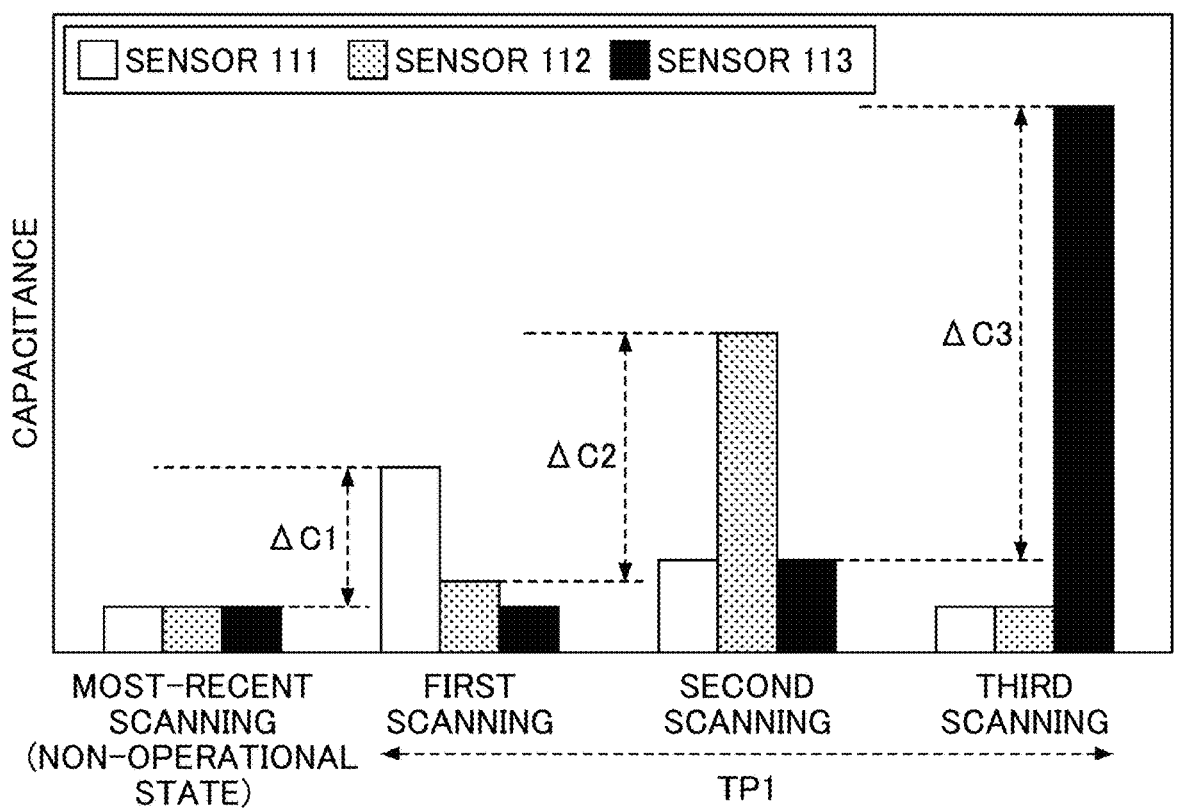

FIGS. 5A and 5B are diagrams illustrating the outputs of the sensors 111, 112, and 113. FIG. 5A is for comparison, illustrating a case of detecting (determining) the user's approach to the door handle 10 using a single threshold for the outputs of the sensors 111, 112, and 113. Specifically, FIG. 5A illustrates a relationship between the output of the sensor 111, 112, or 113 and the threshold in this case. FIG. 5A is a characteristic diagram schematically illustrating the output of the sensor 111, 112, or 113. The average value of the outputs of the sensor 111, 112, or 113 shows similar characteristics.

Here, the outputs of the sensors 111, 112, and 113 are signals to be input to the controller 126. Specifically, signals representing potentials detected by the sensors 111, 112, and 113 are converted to a single signal as an output of the switch 121, and amplified by the amplifier 123. Subsequently, the signal is converted to a digital signal by the ADC 124, and capacitance is obtained by the arithmetic unit 125. That is, the outputs of the sensors 111, 112, and 113 are signals representing capacitance to be input to the controller 126.

As illustrated in FIG. 5A, when the controller 126 detects (determines) a user' approach to the door handle 10 in accordance with the outputs of the sensors 111, 112, and 113 using a single low threshold set to detect the user's approach to the door handle 10, the threshold is exceeded as a result of a single great change in the capacitance due to the influence of noise, unintended motions of the user, or the like. This may be detected as a user's approach to the door handle 10, and can lead to false detection.

Also, when the threshold is increased for avoiding false detection, there is a possibility that the electrostatic sensor 110 will be unable to be activated at a timing right enough for the user not to feel delay in reaction upon the approach of the user to the door handle 10.

In view of this, according to the electrostatic input device 100 of the embodiment, the electrostatic sensor 110 is activated in response to the increment in the capacitance detected by the electrostatic sensor 110 reaching or exceeding a predetermined value Ca (an example of the first predetermined value) the predetermined number of times or more within the predetermined period.

FIG. 5B is an example indicating a waveform obtained through scanning performed by the method as illustrated in FIG. 4 in the normal mode or the power saving mode, and illustrates fluctuations in the capacitances measured by the sensors 111, 112, and 113 in three scanning processes. The capacitance measured by the sensor 111, 112, or 113 in each of the scanning processes indicates an average value of the eight capacitances obtained by application of the eight pulses, as described above. The leftmost capacitance data in this graph is the most-recent scanning result. Here, for ease of understanding, description will be given with the capacitances measured by the sensors 111, 112, and 113 being simply treated as the same value, i.e., C0, assuming a state in which the user is not approaching the door handle 10 (non-operational state).

In each of the scanning processes, three capacitances are measured by the three sensors 111, 112, and 113. In the following description, capacitance increment $\Delta C1$, $\Delta C2$, or $\Delta C3$ obtained from the sensor 111, 112, or 113 in each of the first to third scanning processes is calculated by subtracting, from the maximum value of the capacitances measured in the current scanning process by the sensors 111, 112, and 113, the capacitance measured in the previous scanning process by the sensor (111, 112, or 113) from which the maximum value of the capacitances was obtained.

For the calculation of the increment, as an example, the maximum value of the increments in the capacitance for each of the sensors between the scanning processes may be used as a representative value of the increment between these scanning processes. Alternatively, the increment between the scanning processes may be calculated using an average or total value of the capacitances measured by the sensors in each of the scanning processes. Alternatively, the maximum value of the capacitances measured by the sensors in each of scanning processes may be treated as a representative value in that scanning process, and the increment between the scanning processes may be calculated using the representative value. Alternatively, an average or total value of the increments of the sensors between the scanning processes may be used as the increment between these scanning processes. A calculation method of the increments or the representative value of the capacitances in the scanning processes may be appropriately determined in accordance with a system employed.

As an example, it is assumed that the capacitance measured by the sensor 111 is the maximum in the first scanning process, the capacitance measured by the sensor 112 is the maximum in the second scanning process, and the capacitance measured by the sensor 113 is the maximum in the third scanning process. This assumes, for example, a case in which a person's hand, fingers, and the like approach the sensor 113 obliquely from above the sensor 111.

In this case, $\Delta C1$ is the value obtained by subtracting the capacitance C0 of the most-recent scanning process (non-operational state) from the capacitance measured by the sensor 111 that is the maximum value in the first scanning process. Also, $\Delta C2$ is a value obtained by subtracting the capacitance measured by the sensor 112 in the first scanning process from the capacitance measured by the sensor 112 that is the maximum value in the second scanning process. Similarly, $\Delta C3$ is a value obtained by subtracting the capacitance measured by the sensor 112 in the second scanning process from the capacitance measured by the sensor 113 that is the maximum value in the third scanning process.

As illustrated in FIG. 5B, when the capacitance detected by the electrostatic sensor 110 increases three times or more within a period TP1, and $\Delta C1$, $\Delta C2$, and $\Delta C3$ in the three or more scanning processes for the increment in the capacitance are each a predetermined value Ca or more, the power saving mode is transitioned to the normal mode, thereby activating the electrostatic sensor 110. At this time, $\Delta C1 > Ca$, $\Delta C2 > Ca$, and $\Delta C3 > Ca$.

That is, in the example as illustrated in FIG. 5B, the predetermined period is the period TP1, the predetermined number of times is three, and the capacitance increments used for the determination are $\Delta C1$, $\Delta C2$, and $\Delta C3$. In order to simplify the description, an example in which the capacitance increments reach or exceed the predetermined value Ca in consecutive scanning processes will be described. However, a scanning process in which the increment does not exceed the predetermined value Ca or in which the capacitance decreases may be included between the scanning processes as described above. The scanning processes in which the increments reach or exceed the predetermined value Ca may be non-consecutive as long as the scanning processes in which the increments reach or exceed the predetermined value Ca within the predetermined period exist a predetermined number of times or more. In FIG. 5B, the period TP1 is illustrated as a period that is approximately equal to the period in which the three scanning processes are performed. However, the predetermined period may be set to be a longer period as long as the set period enables performing scanning processes in a larger number of times than the predetermined number of times. The example as illustrated in FIG. 5B illustrates a case in which counting of the period TP1 is started from the start point that is the first scanning process in which the capacitance increment exceeds Ca. However, after the period TP1 is ended, counting of the period TP1 may be started upon the capacitance increment exceeding Ca again. Also, as an example, at the time the capacitance increment exceeds Ca again before the end of counting of the period TP1 started in the first scanning process (e.g., the second or third scanning process in FIG. 5B), the following settings are possible: i.e., counting of the predetermined period may be started from that point in time serving as the start point, counting of the predetermined period may be performed in parallel with counting of the period TP1 started in the first scanning process, and the number of times of proximity may be counted for each of the predetermined periods. At this time, when the number of times of proximity reaches or exceeds the predetermined number of times during counting of one of the predetermined periods, the power saving mode is transitioned to the normal mode. In addition, as an example, the start point of the period TP1 may also be the time a parameter other than the capacitance increment exceeds a predetermined value. Also, the period TP1 may be set to be counted at predetermined time intervals regardless of the predetermined value.

The controller 126 includes a proximity event counter configured to count the number of proximity events. The proximity event counter is an example of the counter. When the capacitance detected by the electrostatic sensor 110 in the current scanning process increases by a value equal to or more than the predetermined value Ca compared to the capacitance detected in the previous scanning process, the controller 126 increments the proximity event counter. When the proximity event counter is three or more within a predetermined period (the period TP1), the controller 126 activates the electrostatic sensor 110.

Hereinafter, fulfillment of the following condition will be referred to as fulfillment of an activation condition, i.e., in the power saving mode, the capacitance increments ΔC1, ΔC2, and ΔC3 detected by the electrostatic sensor 110 reach or exceed the predetermined value Ca three times or more in the period TP1. When the activation condition is fulfilled, the controller 126 activates the electrostatic sensor 110.

According to the electrostatic input device 100 of the embodiment, when the electrostatic sensor 110 is in the standby state, the user's approach to the door handle 10 is detected (determined) using the determination method as illustrated in FIG. 5B.

In a case in which the activation condition is fulfilled and the electrostatic sensor 110 is activated, when the controller 126 determines that the output of the sensor 111, 112, or 113 in the normal mode exceeds the threshold that determines contact with the vehicle 1 (see FIG. 1), the controller 126 determines contact with the door handle 10 and transmits a signal permitting unlocking of a door lock to an ECU (Electronic Control Unit) configured to control the door lock of the vehicle 1. As a result, the door lock is unlocked.

Figure 6:
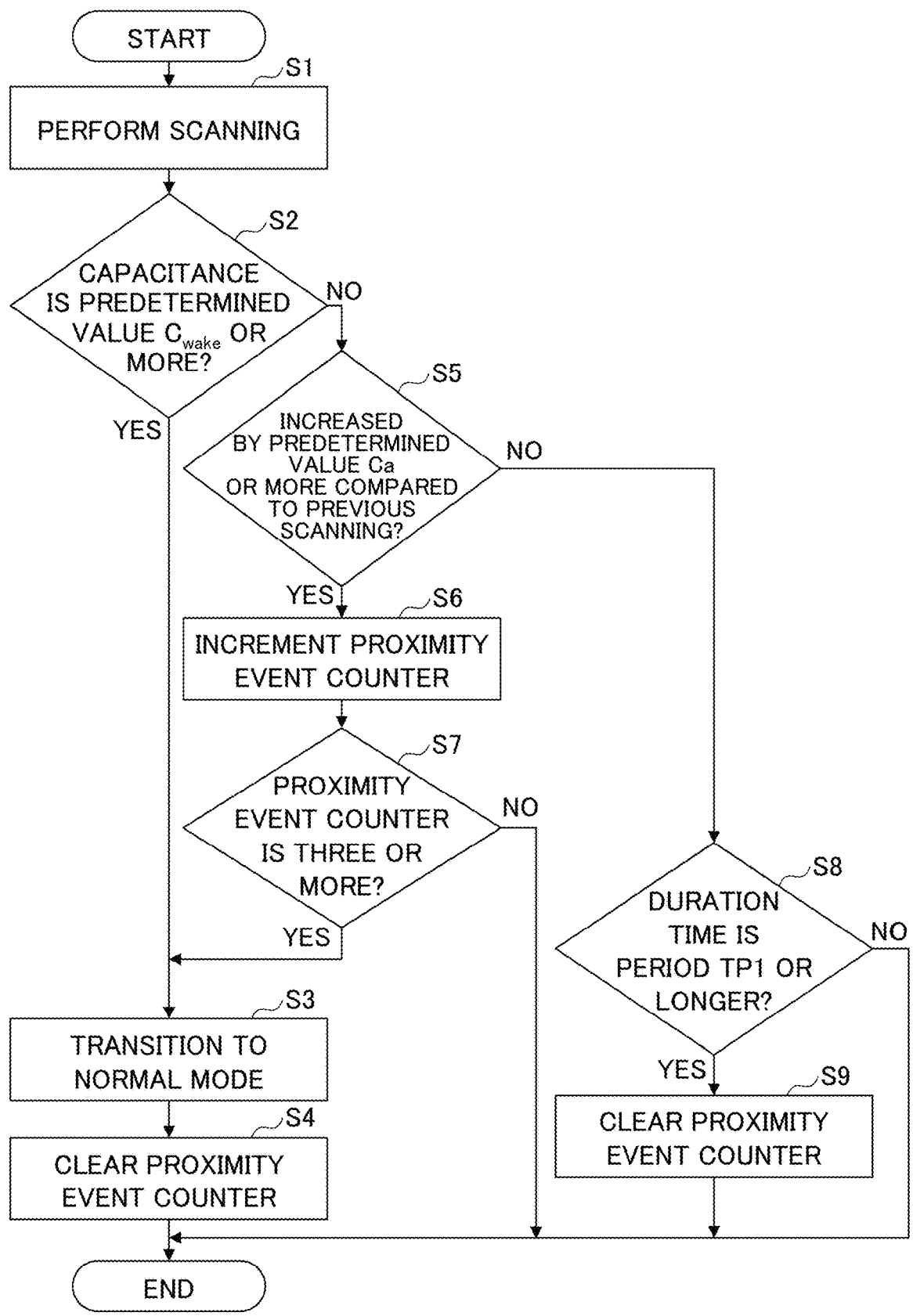
FIG. 6 is a flowchart illustrating a process executed by a controller 126 in the power saving mode.

FIG. 6 is a flowchart illustrating a process executed by the controller 126 in the power saving mode. The controller 126 repeatedly executes the flowchart as illustrated in FIG. 6 in a predetermined control cycle corresponding to the single scanning process as illustrated in FIG. 4. Here, the capacitance calculated by the arithmetic unit 125 is converted from an analog value to a digital value and, for example, 10 pF becomes one count as a digital value.

When the process is started, the controller 126 performs scanning of the sensors 111, 112, and 113 by controlling the connection of the switches 121 and 122 in the power saving mode (step S1).

The controller 126 determines whether or not the capacitance calculated by the arithmetic unit 125 is equal to or more than a predetermined value Cwake that permits transition to the normal mode (step S2). The capacitance calculated at this time indicates the average value of the eight capacitances obtained by application of the eight pulses, as described above. Also, the predetermined value Cwake is set to be a value of capacitance large enough to accurately determine an increase in capacitance caused by the user's approach to the door handle 10 through single determination using a single threshold without causing false detection.

When the controller 126 determines that the calculated capacitance is the predetermined value Cwake or more (S2: YES), transition to the normal mode is performed (step S3). Here, as an example, description will be given of a configuration in which a condition for transition to step S3 is being equal to or more than the predetermined value Cwake representing the user's approach to the door handle 10. However, when it can be reliably determined that the user has approached the sensors 111, 112, and 113, such a condition may be used as the condition for transition to the normal mode.

The controller 126 clears the proximity event counter stored in a memory to be 0 (step S4).

When the controller 126 ends the process of step S4, the controller 126 ends the process in the control cycle corresponding to the current scanning timing (END).

When the controller 126 determines in step S2 that the calculated capacitance is not the predetermined value Cwake or more (S2: NO), the controller 126 determines whether or not the increment from the capacitance obtained in the previous scanning process is the predetermined value Ca or more (step S5).

The determination in step S5 is an operation corresponding to the example as illustrated in FIG. 5B, i.e., a process that determines whether or not the maximum value of the three capacitances obtained by the sensors 111, 112, and 113 in the current scanning process has increased by the predetermined value Ca or more from the capacitance of the corresponding sensor (111, 112, or 113) in the previous scanning process.

When the controller 126 determines that the increment has increased by the predetermined value Ca or more (S5: YES), the controller 126 increments the proximity event counter, i.e., adds one to the count value stored in the memory, followed by overwriting (step S6).

The controller 126 determines whether or not the proximity event counter is three or more (step S7).

When the controller 126 determines that the proximity event counter is three or more (S7: YES), the controller 126 causes the flow to proceed to step S3 for performing transition to the normal mode.

When the controller 126 determines in step S5 that the increment has not increased by the predetermined value Ca or more (S5: NO), the controller 126 determines whether or not the time from the start of counting, i.e., the duration time, is equal to or longer than the period TP1 (step S8).

When the controller 126 determines that the duration time is equal to or longer than the period TP1 (S8: YES), the controller 126 clears the proximity event counter stored in the memory to be 0 (step S9).

When the controller 126 determines in step S7 that the proximity event counter is not three or more (S7: NO), the controller 126 ends the process in the current control cycle (END). Then, the controller 126 repeats the process from step S1 in a control cycle corresponding to the next scanning timing.

When the controller 126 determines in step S8 that the duration time is not equal to or longer than the period TP1 (S8: NO), the controller 126 ends the process in the control cycle corresponding to the current scanning timing (END).

In the process as described above, transition to the normal mode is performed when the capacitance detected by the electrostatic sensor 110 increases as a result of the approach of the user to the door handle 10 in the power saving mode, and the increment in capacitance from the capacitance in the previous scanning process reaches or exceeds the predetermined value Ca three times or more within the period TP1.

Therefore, it is possible to suppress false detection due to noise, unintended motions of the user, or the like, and quickly transition the power saving mode to the normal mode as the user's hand, fingers, and the like approach the electrostatic sensor.

Accordingly, it is possible to provide the electrostatic sensor 110 that is quickly activated from the standby state and is suppressed in false detection.

In the above, a configuration in which the electrostatic sensor 110 includes the three sensors 111, 112, and 113 has been described. The number of sensors may be two or may be four or more. In these cases, a control process performed by the controller 126 is the same as that in which the electrostatic sensor 110 includes the three sensors 111, 112, and 113.

The electrostatic sensor 110 may include a single sensor (e.g., the sensor 111). In this case, when the capacitance obtained by the sensor 111 reaches or exceeds the predetermined value Ca three times or more within the period TP1 compared to the capacitance in the previous scanning process, the power saving mode may be transitioned to the normal mode.

In step S5, the proximity event counter is incremented when the value of the capacitance increases by the predetermined value Ca or more from the time of the previous scanning process. However, the proximity event counter may be incremented when the capacitance increment increases over time. Specifically, as illustrated in FIG. 5B, the capacitance increment obtained in the first scanning process within the period TP1 is denoted by ΔC1, the capacitance increment obtained in the second scanning process within the period TP1 is denoted by ΔC2, and the capacitance increment obtained in the third scanning process within the period TP1 is denoted by ΔC3. Here, in step S5, when ΔC1 is the predetermined value Ca or more in the first scanning process, a relation of ΔC1<ΔC2 is fulfilled in the second scanning process, or a relation of ΔC2<ΔC3 is fulfilled in the third scanning process, the proximity event counter may be incremented. In this case, a scanning process in which the increment does not exceed the predetermined value Ca or the capacitance decreases during the period TP1 may be included. A possible method for confirming this is as follows. Specifically, the capacitance values in the scanning processes are stored in the memory. The increments in the scanning processes that are the predetermined value Ca or more are denoted by ΔC1, ΔC2, and ΔC3. Fulfillment of a relation of ΔC1<ΔC2<ΔC3 within the period TP1 is determined. When the relation is fulfilled, transition to the normal mode is performed. The same applies to subsequent ΔC1, ΔC2, and ΔC3.

In the above description, a case in which the increment increases in the first, second, and third scanning processes has been described. However, the predetermined value for comparison may be increased gradually and compared. Specifically, when Ca<ΔC1, Cb<ΔC2, Cc<ΔC3, and Ca<Cb<Cc are fulfilled, transition to the normal mode may be performed.

Also, a threshold may be provided for the difference between the capacitance increments obtained within the period TP1. Specifically, as illustrated in FIG. 5B, when the capacitance increments ΔC1, ΔC2, and ΔC3 obtained three times within the period TP1 each increase over time by the predetermined value Ca or more, transition to the normal mode may be performed. This means fulfillment of ΔC2−ΔC1>Ca and ΔC3−ΔC2>Ca. This case indicates that the hand is approaching with an increasing speed. When the hand is approaching with an increasing speed, transition to the normal mode may be performed earlier. That is, when the hand is approaching with an increasing speed, a low threshold may be used such that transition to the normal mode is performed even if the hand is not close. This determination is performed in step S5. That is, when the controller 126 determines that a relation of ΔCn+1−Δn>Ca (where n is a natural number) is fulfilled (S5: YES), the controller 126 increments the proximity event counter, i.e., adds one to the count value stored in the memory, followed by overwriting (step S6). Meanwhile, when the controller 126 determines in step S5 that a relation of ΔCn+1−Δn>Ca is not fulfilled (S5: NO), the controller 126 determines whether or not the time from the start of counting, i.e., the duration time, is equal to or longer than the period TP1 (step S8).

Also, when the difference between the capacitance increments is Ca or more and increases over time such that a relation of ΔC3−ΔC2>ΔC2−ΔC1>Ca is fulfilled, transition to the normal mode may be performed.

In other words, when the difference between the capacitance increments increases over time and increases stepwise from Ca to Cb (>Ca) such that relations of ΔC2−ΔC1>Ca, ΔC3−ΔC2>Cb, and Cb>Ca are fulfilled, transition to the normal mode may be performed.

Regarding step S8, a configuration in which the proximity event counter is cleared after the period TP1 has passed, has been described. However, for example, when a very large increment is obtained, such as when an increment from the capacitance obtained in the previous scanning process is two or more times larger than the predetermined value Ca, even if the value obtained in the current scanning process is less than the predetermined value and the period TP1 has passed, the count value may not be decremented or changed to one without clearing the proximity event counter. This is because of enabling quicker transition to the normal mode (activating the electrostatic sensor 110) at the time of the next determination in view of the individual differences in the way to approach the vehicle 1. The value that is two times larger than the predetermined value Ca is an example of a third predetermined value. The decremented count value "1" or the unchanged count value is an example of a second predetermined count value.

Figure 7:
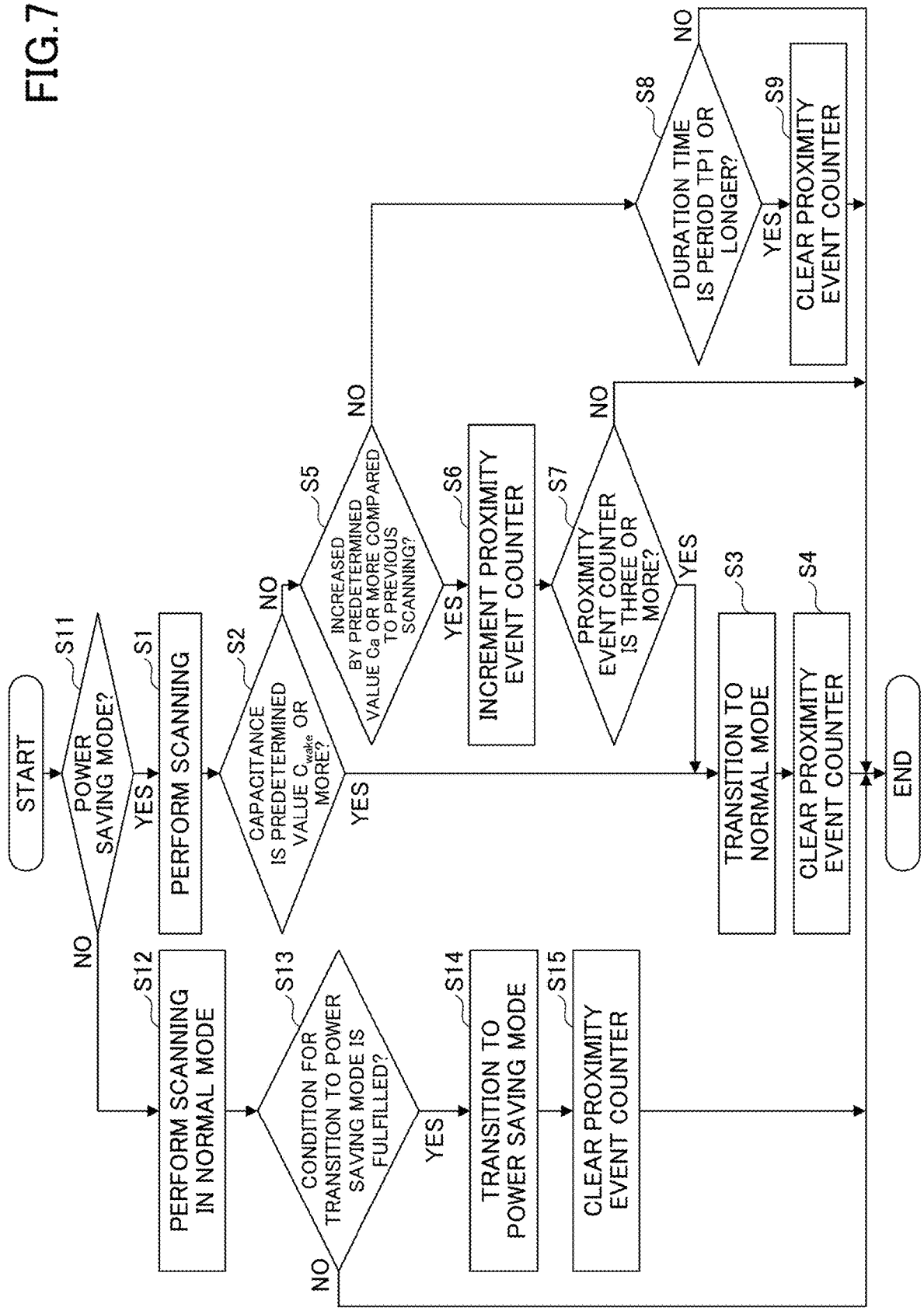
FIG. 7 is a flowchart illustrating a process executed by the controller 126 in a first modified example of the embodiment.

FIG. 7 is a flowchart illustrating a process executed by the controller 126 in the first modified example of the embodiment. The flowchart as illustrated in FIG. 7 is the same as the flowchart as illustrated in FIG. 6 except for addition of a transition process from the normal mode to the power saving mode, i.e., a process of steps S11 to S15. Thus, only the difference from FIG. 6 will be described.

When the process is started, the controller 126 determines whether or not the power saving mode is set (step S11).

When the controller 126 determines that the power saving mode is not set (step S11: NO), the controller 126 performs a scanning process in the normal mode (step S12). That is, as illustrated in FIG. 4, scanning is performed at 5 ms cycles.

The controller 126 determines whether or not the condition for transition to the power saving mode is fulfilled (step S13). The condition for transition to the power saving mode is that the capacitance obtained by the sensors 111, 112, and 113 over the past 30 seconds is equal to or less than a predetermined value indicating no contact with the door handle 10. The 30 seconds is an example of a predetermined time included in the condition for transition to the power saving mode.

When the controller 126 determines that the condition for transition to the power saving mode is fulfilled (S13: YES), the controller 126 performs transition to the power saving mode (step S14).

The controller 126 clears the proximity event counter (step S15). When the controller 126 ends the process of step S15, the controller 126 ends the flow (END).

When the controller 126 determines in step S13 that the condition for transition to the power saving mode is not fulfilled (S13: NO), the controller 126 ends the flow (END).

When the controller 126 determines in step S11 that the power saving mode is set (S11: YES), the controller 126 causes the flow to proceed to step S1. Subsequently, the process proceeds in the same manner as in the flowchart as illustrated in FIG. 6.

In a manner in which setting to the power saving mode is first determined as illustrated in FIG. 7, when the controller 126 determines that the power saving mode is not set (S11: NO), scanning in the normal mode is performed.

Figure 8:
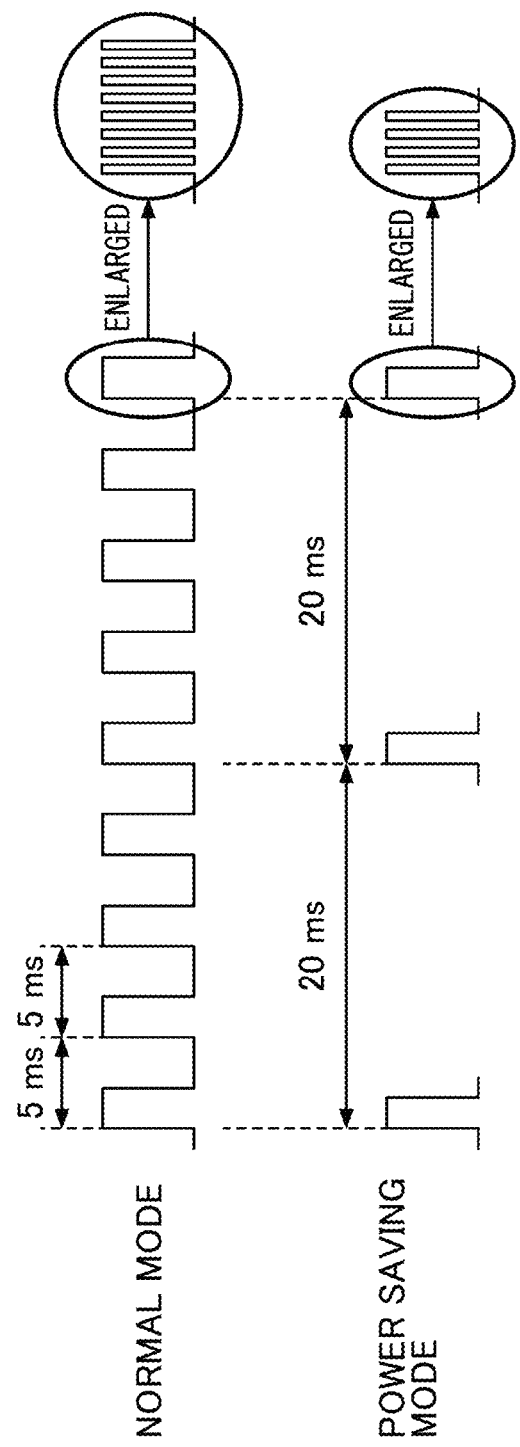
FIG. 8 is a diagram illustrating pulse waveforms used for scanning in the normal mode and the power saving mode in a second modified example of the embodiment.

FIG. 8 is a diagram illustrating pulse waveforms used for scanning in the normal mode and the power saving mode in the second modified example of the embodiment.

In the normal mode, similar to FIG. 4, the sensors 111, 112, and 113 are scanned at 5 ms intervals as an example. The pulse voltage applied every 5 ms includes eight pulses as an example, as illustrated in the right-hand enlarged view. The capacitance calculated by the arithmetic unit 125 in a single scanning process is an average value of the eight capacitances obtained by application of the eight pulses as illustrated in the enlarged view.

Meanwhile, in the power saving mode, the sensors 111, 112, and 113 are scanned at 20 ms intervals as an example. However, the pulse voltage applied every 20 ms includes four pulses as an example, as illustrated in the right-hand enlarged view. The capacitance calculated by the arithmetic unit 125 in a single scanning process is an average value of the four capacitances obtained by application of the four pulses as illustrated in the enlarged view. That is, the number of times of measurement in the single scanning process is four.

In this manner, by reducing the number of times of measurement in the single scanning process, the power consumed in the power saving mode can be further reduced.

Figure 9:
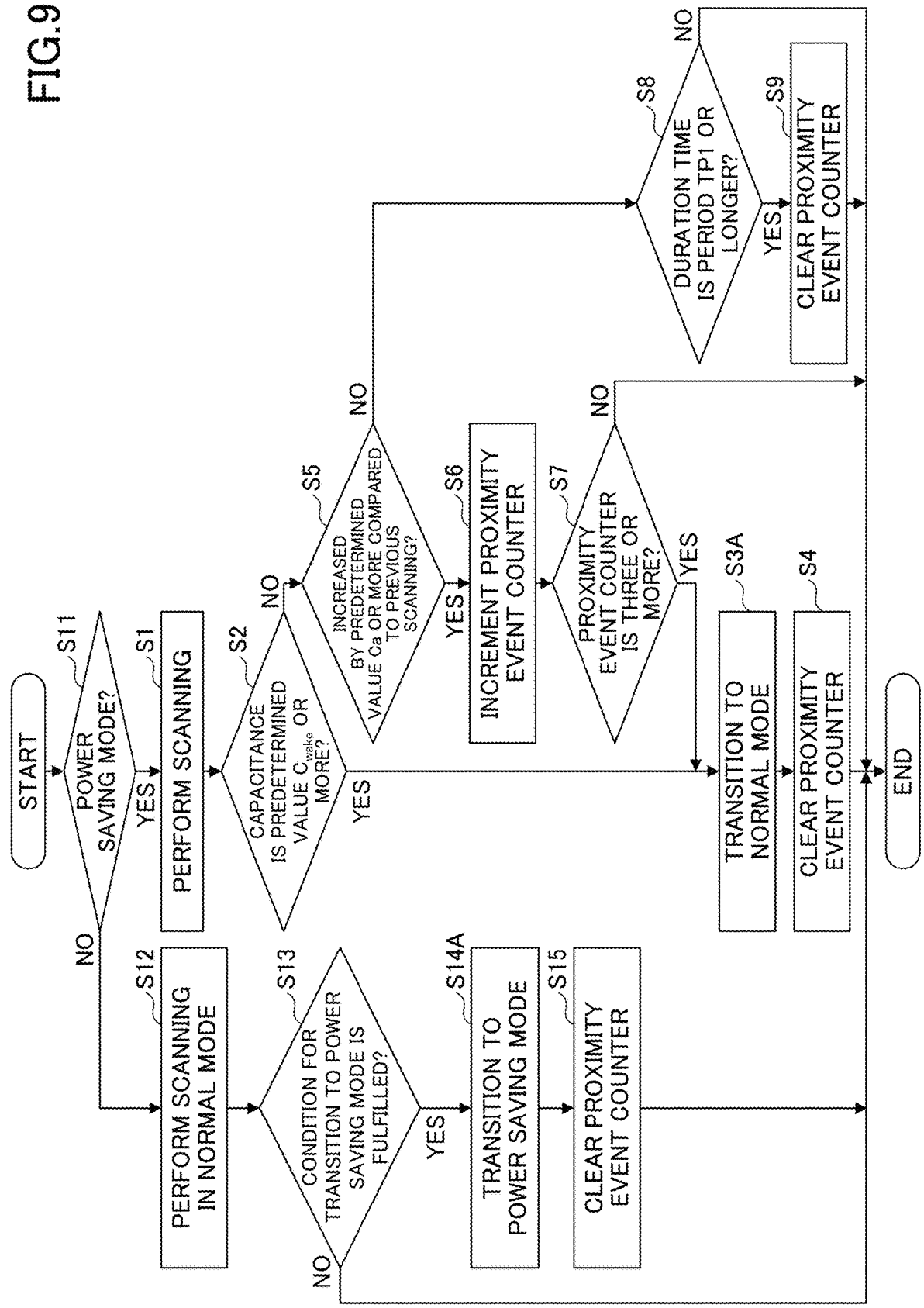
FIG. 9 is a flowchart illustrating a process executed by the controller 126 in the second modified example of the embodiment.

FIG. 9 is a flowchart illustrating a process executed by the controller 126 in the second modified example of the embodiment. The flowchart as illustrated in FIG. 9 is the same as the flowchart as illustrated in FIG. 7 except that the processes in steps S3 and S14 are changed. Thus, only the difference from FIG. 7 will be described.

When the controller 126 determines that the condition for transition to the power saving mode is fulfilled (S13: YES), the controller 126 performs transition to the power saving mode (step S14A). In step S14A, as illustrated in the enlarged view of the power saving mode in FIG. 8, the number of times of measurement in the single scanning process is reduced to four.

When the controller 126 determines in step S2 that the capacitance is the predetermined value Cwake or more (S2: YES), the controller 126 performs transition to the normal mode (step S3A). In step S3A, the number of times of measurement in the single scanning process is changed to eight in the normal mode.

As described above, in the power saving mode, the number of times of measurement in the single scanning process may be reduced compared to that in the normal mode. Although the manner in which the number of times of measurement is reduced to four has been described here, the number of times of measurement may be as desired, as long as it is less than the number of times of measurement in the normal mode.

Figure 10:
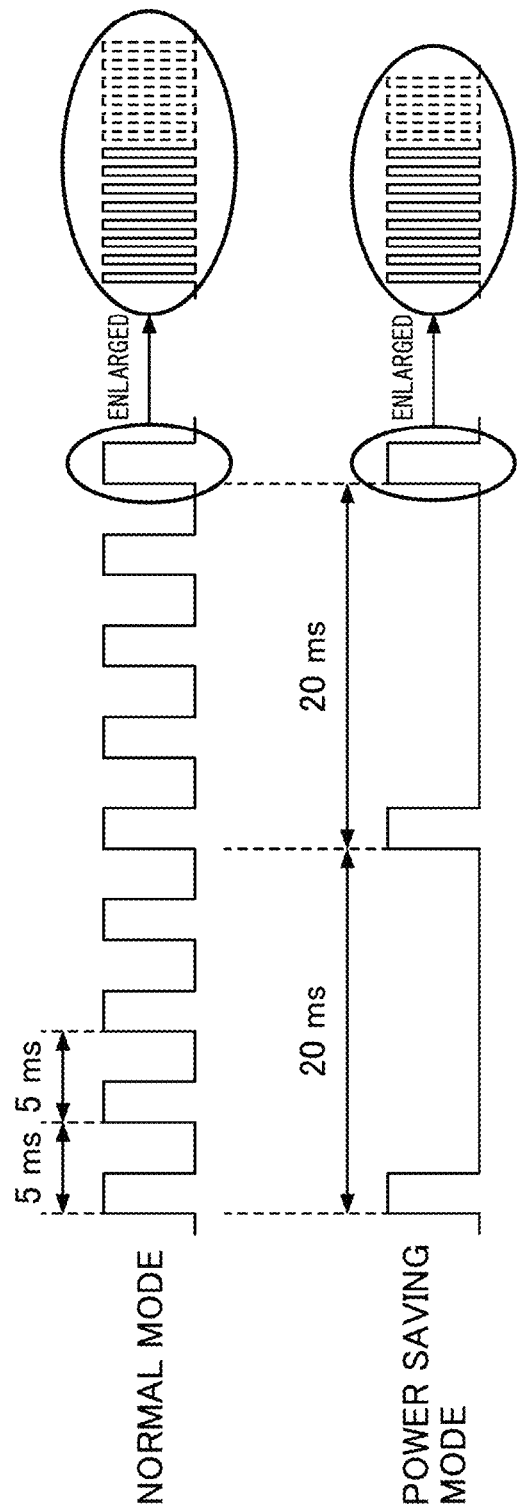
FIG. 10 is a diagram illustrating pulse waveforms used for scanning in the normal mode and the power saving mode in a third modified example of the embodiment.

FIG. 10 is a diagram illustrating pulse waveforms used for scanning in the normal mode and the power saving mode in the third modified example of the embodiment.

In the power saving mode, the capacitance is measured in a state in which the user is approaching the door handle 10. Thus, the measurement can be influenced by disturbance noise and the like. In such a case, the frequency at which the pulses used for performing measurement multiple times in the single scanning process are output may be changed to a frequency that is less influenced by noise. Here, what is called frequency hopping is utilized for changing the frequency.

In order to select a frequency that is less influenced by noise, it is necessary to detect such a frequency that is less influenced by noise. The level of noise can be estimated by continuously measuring capacitances of the same frequency in a very short cycle and observing the difference between them. According to the third modified example, as illustrated in the enlarged view of FIG. 10, in the normal mode, solid-line eight pulses for measurement are output, followed by changing the frequency and outputting dashed-line six pulses for detecting the frequency that is less influenced by noise. Here, measuring the capacitance with the dashed-line pulses is referred to as noise scanning.

When such noise scanning is performed, the frequency is less influenced by noise as the capacitance calculated by the arithmetic unit 125 is lower. The dashed-line six pulses are those of three different frequencies, and two pulses of the same frequency are output consecutively.

The measurement is performed with six pulses for noise scanning, and the frequency of the pulse at which the capacitance is the lowest may be set to the frequency of the eight pulses for the measurement in the next scanning.

When utilizing such frequency hopping, in the power saving mode, solid-line eight pulses for measurement are output, followed by changing the frequency, and dashed-line four pulses for noise scanning are output. That is, the number of the dashed-line pulses for noise scanning is smaller by two than in the normal mode.

Thus, in the power saving mode, the power consumption can be reduced by reducing the number of pulses for noise scanning. The number of values of the frequency and the number of pulses as described in FIG. 10 are examples, and can be appropriately changed.

Figure 11:
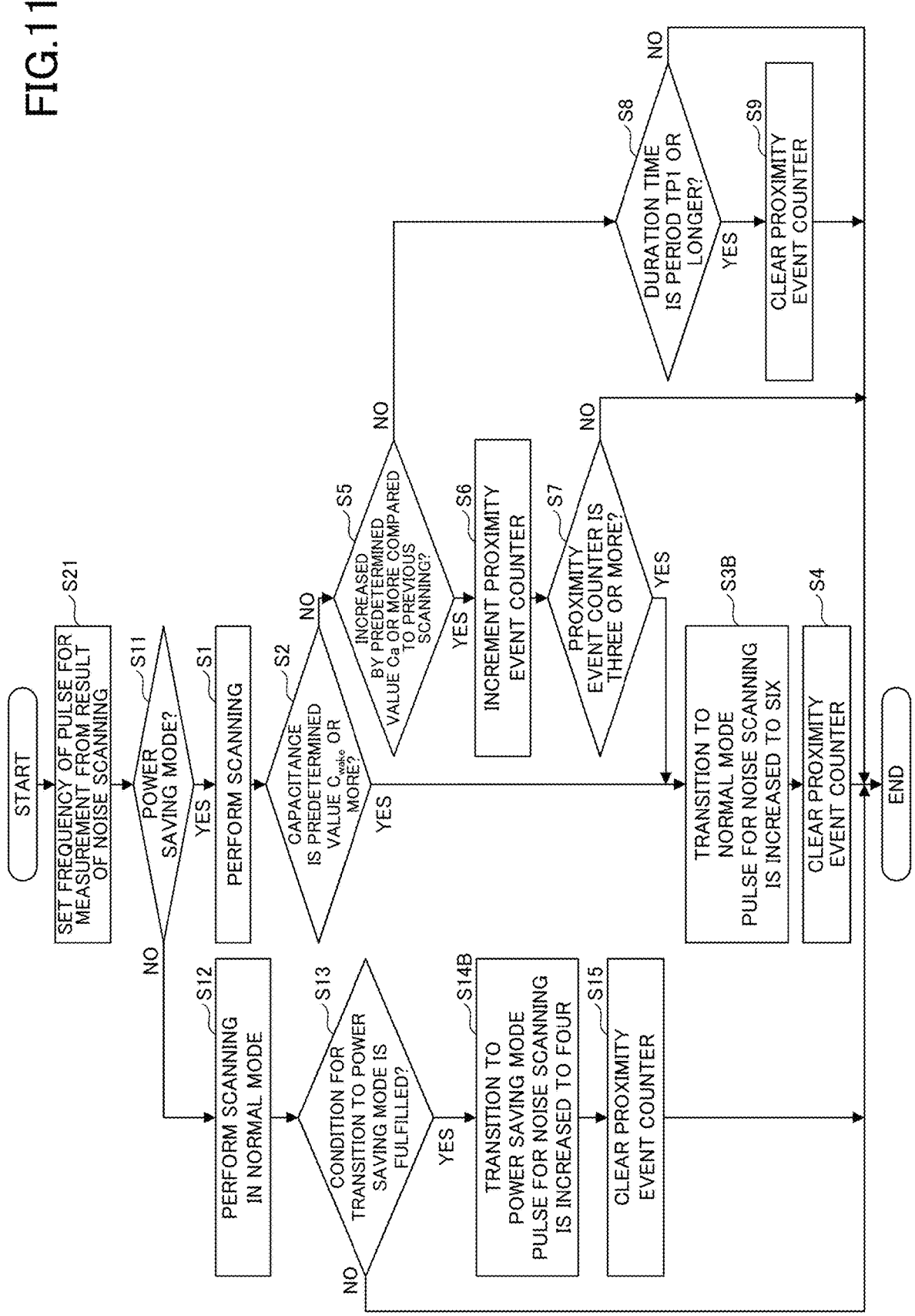
FIG. 11 is a flowchart illustrating a process executed by the controller 126 in the third modified example of the embodiment.

FIG. 11 is a flowchart illustrating a process executed by the controller 126 in the third modified example of the embodiment. The flowchart as illustrated in FIG. 11 is the same as the flowchart as illustrated in FIG. 9 except that step S21 is added and the processes of steps S3 and S14 are changed. Thus, only the difference from FIG. 9 will be described.

When the process is started, the controller 126 sets the frequency of pulses for measurement from the result of noise scanning (step S21). When the process of step S21 is performed for the first time, the result of noise scanning does not exist, and thus the frequency of pulse for noise scanning may be set to a predetermined initial value. When the controller 126 ends the process of step S21, the controller 126 causes the flow to proceed to step S11.

In step S14B, the controller 126 reduces the number of pulses for noise scanning to four upon transition to the power saving mode (step S14B).

In step S3B, the controller 126 increases the number of pulses for noise scanning to six upon transition to the normal mode (step S3B).

As described above, when performing noise scanning utilizing frequency hopping, the power consumption may be reduced by reducing the number of pulses for noise scanning in the power saving mode.

Figure 12:
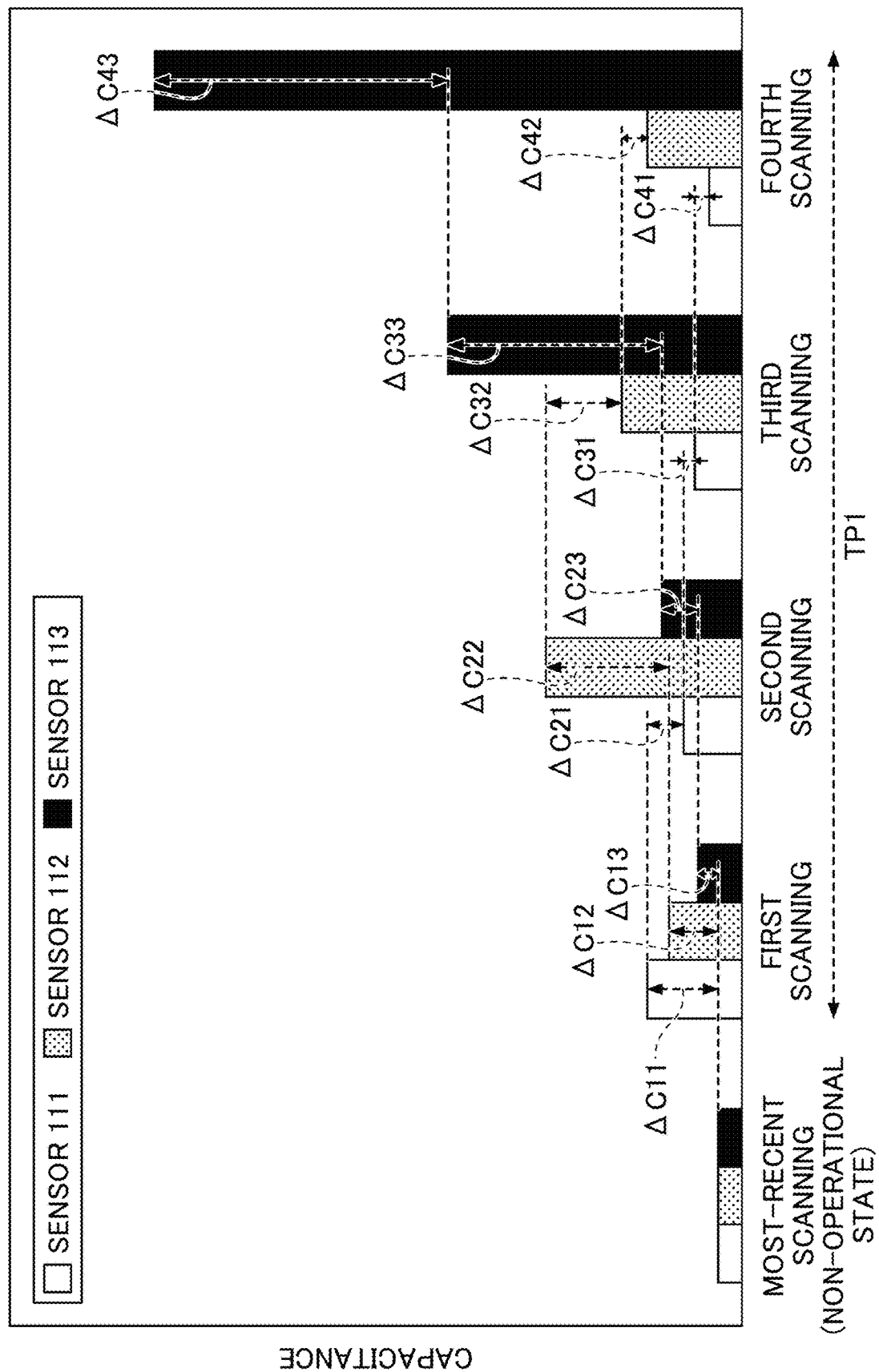
FIG. 12 is a diagram illustrating the outputs of the sensors 111, 112, and 113 in a fourth modified example of the embodiment.

FIG. 12 is a diagram illustrating outputs of the sensors 111, 112, and 113 in the fourth modified example of the embodiment. In the fourth modified example, as illustrated in FIG. 5B, when the capacitance increments ΔC1, ΔC2, and ΔC3 over three times or more increase by the predetermined value Ca or more over time, the cumulative value of the differences between the increments is used to determine whether or not to perform transition, instead of performing transition to the normal mode.

As illustrated in FIG. 12, when the sensors 111, 112, and 113 are scanned four times, it is assumed that the capacitance increments obtained by the sensors 111, 112, and 113 in the first scanning process are ΔC11, ΔC12, and ΔC13. Similarly, it is assumed that the capacitance increments obtained by the sensors 111, 112, and 113 in the second scanning process are ΔC21, ΔC22, and ΔC23, and the capacitance increments obtained by the sensors 111, 112, and 113 in the third scanning process are ΔC31, ΔC32, and ΔC33. It is also assumed that the capacitance increments obtained by the sensors 111, 112, and 113 in the fourth scanning process are ΔC41, ΔC42, and ΔC43.

In this case, when the cumulative value of the differences between: the capacitance increments obtained over time within the predetermined period (period TP1); and the capacitance increments in the corresponding previous scanning processes reaches or exceeds the predetermined value Cb the predetermined number of times or more, transition to the normal mode is performed. In the example as illustrated in FIG. 5B, the period TP1 is started from the start point that is the scanning process in which the capacitance increment exceeds Ca. In the fourth modified example of the present embodiment, as an example, a scanning process in which the capacitance increment exceeds a predetermined value is the start point (in FIG. 12, it is assumed that the capacitance increment exceeds the predetermined value in the first scanning process). However, this is by no means a limitation. The start point of the period TP1 may be the time the cumulative value of the differences between the increments exceeds the predetermined value or may be the time the capacitance exceeds the predetermined value. Also, in addition to the time the capacitance increment or the cumulative value of the differences between the increments exceeds the predetermined value as described above, the start point of the period TP1 may be set at predetermined time intervals.

The cumulative value as used in the present disclosure may be a cumulative value of target numerical values (differences between the capacitance increments in the fourth modified example of the embodiment as described above) during the previously set scanning period or at the previously set number of times of scanning processes. Also, the scanning period or the number of scanning processes for cumulation is set to an appropriate period or number of times in accordance with the detection level of the capacitance, the scanning conditions, and the like. For example, the scanning period for which the cumulative value is obtained may be the same as or shorter than the above predetermined period (period TP1). Also, the cumulative value obtained through cumulation that is started from a period before the above predetermined period (period TP1) may be set. The cumulative value is cleared at the end of the scanning period for cumulation or the number of times of scanning processes for cumulation.

When the electrostatic sensor 110 includes the sensors 111, 112, and 113, the difference from the capacitance increments in the previous scanning process can be obtained as a difference between an average value of the capacitance increments in the previous scanning process and an average value of the capacitance increments in the current scanning process.

The cumulative value is obtained as follows. For example, when four scanning processes are performed, a difference Cα1 is determined by subtracting the average value of increments ΔC11, ΔC12, and ΔC13 obtained in the first scanning process from the average value of increments ΔC21, ΔC22, and ΔC23 obtained in the second scanning process.

Similarly, a difference Cα2 is determined by subtracting the average value of the increments ΔC21, ΔC22, and ΔC23 obtained in the second scanning process from the average value of the increments ΔC31, ΔC32, and ΔC33 obtained in the third scanning process.

Similarly, a difference Cα3 is determined by subtracting the average value of the increments ΔC31, ΔC32, and ΔC33 obtained in the third scanning process from the average value of the increments ΔC41, ΔC42, and ΔC43 obtained in the fourth scanning process.

Then, the cumulative value (total value) of the differences Cα1, Cα2, and Cα3 is determined. When this cumulative value is equal to or more than the predetermined value Cb (an example of the second predetermined value), transition to the normal mode is performed. The predetermined value here is a value indicating how closely the user has approached the door handle 10.

Instead of the average value of the increments obtained in each of the scanning processes, the maximum value or the total value of the increments of the three sensors obtained in each of the scanning processes may be used. A calculation method of the increments or the representative value of the capacitances in the scanning processes may be appropriately determined in accordance with a system employed.

Figure 13:
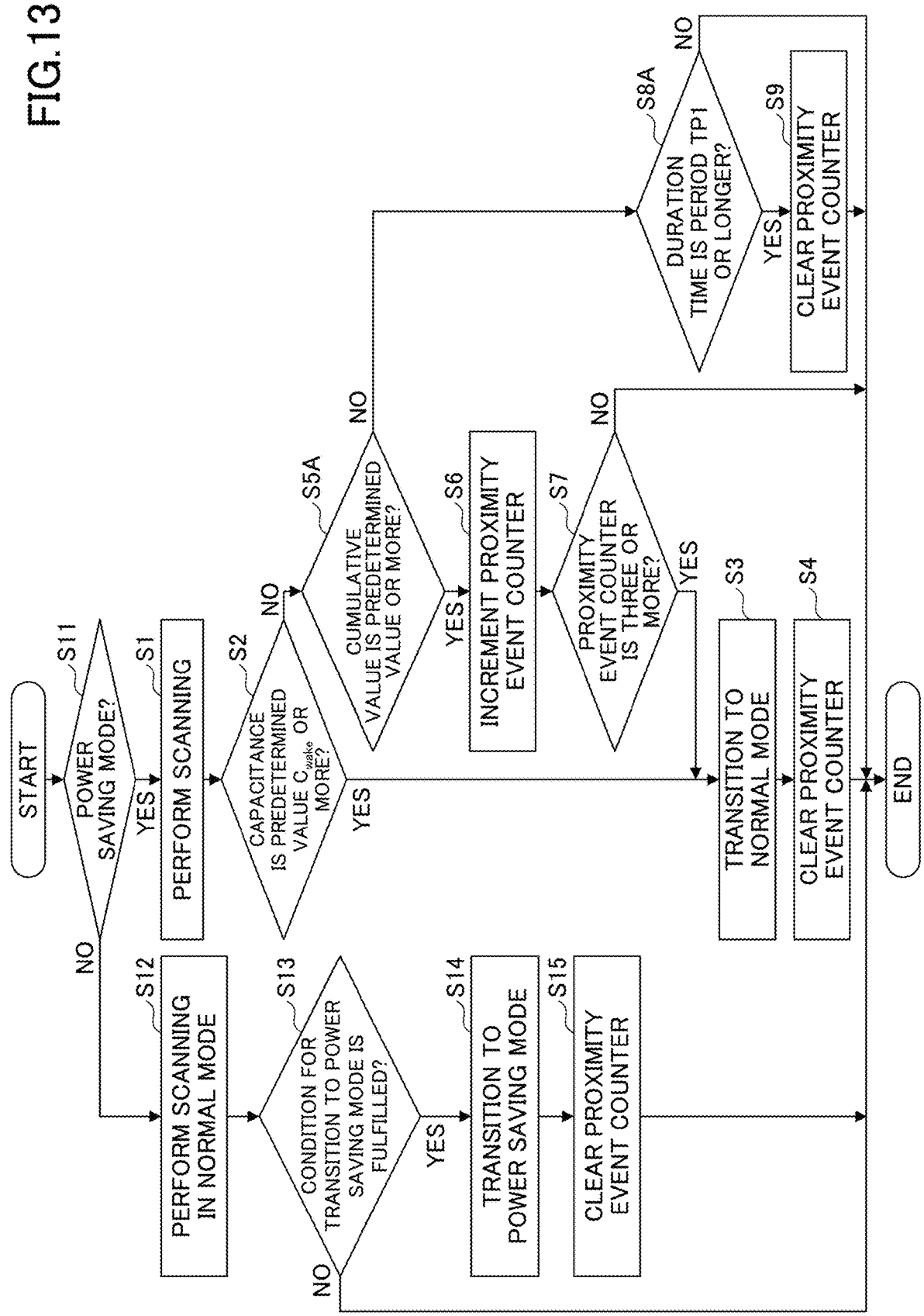
FIG. 13 is a flowchart illustrating a process executed by the controller 126 in the fourth modified example of the embodiment.

FIG. 13 is a flowchart illustrating a process executed by the controller 126 in the fourth modified example of the embodiment. The flowchart as illustrated in FIG. 13 is the same as the flowchart as illustrated in FIG. 9 except that the processes of steps S5 and S8 are changed. Thus, only the difference from FIG. 9 will be described.

In step S5A, the controller 126 determines whether or not the cumulative value of the differences between the average value of the capacitance increment obtained in the previous scanning process and the average value of the capacitance increment obtained in the current scanning process is the predetermined value Cb or more (step S5A).

In step S8A, when the controller 126 determines in step S5A that the cumulative value is not the predetermined value Cb or more (S5A: NO), the controller 126 determines whether or not the duration time is the period TP1 or longer (step S8A).

In the flowchart as illustrated in FIG. 13, the scanning process in step S1 is repeated. As a result, when the cumulative value of the differences reaches or exceeds the predetermined value Cb three times or more within the period TP1, it is determined to be YES in step S7 and then transition to the normal mode is performed in step S3, thereby activating the electrostatic sensor 110. The number of times based on which it is determined to be YES in step S7 may be appropriately set. For example, the electrostatic sensor 110 may be activated even when the cumulative value reaches or exceeds the predetermined value Cb only once.

The above-described configuration uses the cumulative value of the differences of the capacitance increments from the capacitance increments obtained in the previous scanning process. However, the same process may be performed using the capacitance increments rather than the differences therebetween. For example, when the cumulative value of the capacitance increments ΔC1, ΔC2, and ΔC3 reaches or exceeds the predetermined value Cb the predetermined number of times, transition to the normal mode is performed. At this time, the predetermined value Cb for the cumulative value may be set to increase stepwise.

At this time, only the capacitance increments ΔC1, ΔC2, and ΔC3 that are the predetermined value Ca or more may be used, and when the cumulative value thereof reaches or exceeds the predetermined value Cb, transition to the normal mode may be performed.

Alternatively, when the capacitance increment ΔC1 is the predetermined value Ca or more and a relation of ΔC1<ΔC2<ΔC3 is fulfilled, the cumulative value of ΔC1, ΔC2, and ΔC3 may be calculated and used for determination.

In this case, when relations of $C\alpha<\Delta C1$, $Cb<\Delta C2$, and $Cc<\Delta C3$, and a relation of $C\alpha<Cb<Cc$ are fulfilled, the cumulative value of $\Delta C1$, $\Delta C2$, and $\Delta C3$ may be calculated and used for determination.

It is possible to provide an electrostatic input device that is capable of activating the capacitance detector in a state before determination of contact, and suppresses false detection.

Although the electrostatic input device of the illustrative embodiment of the present invention has been described above, the present invention may be any combination of the specifically disclosed embodiments.

The present invention is not limited to the specifically disclosed embodiments, and can be changed and modified in various ways without departing from the claims recited.

What is claimed is:

1. An electrostatic input device, comprising:
   a capacitance detector that is disposed at an operation part to be operated by a living body, and is configured to repeatedly detect capacitance; and
   a controller that is formed of an integrated circuit, and is configured to transition the capacitance detector to an activated state in response to an increment in the capacitance detected by the capacitance detector reaching or exceeding a first predetermined value a plurality of times within a predetermined period in a case in which the capacitance detector is in a standby state and no contact with the living body is detected,
   the increment in the capacitance is a difference between a capacitance value detected in a previous detection and a capacitance value detected in a current detection among capacitance values repeatedly detected by the capacitance detector, the difference being calculated by subtracting the capacitance value detected in the previous detection from the detected capacitance value detected in the current detection.

2. The electrostatic input device according to claim 1, wherein
   the controller includes a counter configured to increment a value in response to the increment in the capacitance reaching or exceeding the first predetermined value, and
   the controller is configured to transition the capacitance detector to the activated state in response to a count value of the counter reaching a predetermined count value within the predetermined period, the predetermined count value corresponding to the predetermined number of times.

3. The electrostatic input device according to claim 2, wherein
   in response to the count value of the counter not reaching the predetermined count value within the predetermined period, the controller is configured to
      clear the count value of the counter in response to the increment in the capacitance reaching or falling below a third predetermined value that is greater than the first predetermined value, or
      set a second predetermined value that is less than the predetermined count value without clearing the count value in response to the increment in the capacitance reaching or exceeding the third predetermined value.

4. The electrostatic input device according to claim 1, wherein
   the controller is configured to transition the capacitance detector to the activated state in response to an increase over time in the increment in the capacitance that reaches or exceeds the first predetermined value.

5. The electrostatic input device according to claim 1, wherein
   the controller is configured to increase the first predetermined value stepwise within the predetermined period.

6. The electrostatic input device according to claim 1, further comprising:
   the operation part.

7. The electrostatic input device according to claim 1, wherein
   the controller is configured to
      set the capacitance detector to be in the standby state without the living body contacting the operation part, and
      set the capacitance detector to be in the activated state with the living body contacting the operation part.

8. The electrostatic input device according to claim 1, wherein
   the capacitance detector includes multiple sensors, and
   the controller is configured to transition the capacitance detector to the activated state using, as the capacitance, a maximum value, an average value, or a total value of multiple capacitances that are detected by the multiple sensors the predetermined number of times or more within the predetermined period.

9. An electrostatic input device, comprising:
   a capacitance detector that is disposed at an operation part to be operated by a living body, and is configured to repeatedly detect capacitance; and
   a controller that is formed of an integrated circuit, and is configured to transition the capacitance detector to an activated state in response to a difference between increments in the capacitance consecutively detected by the capacitance detector reaching or exceeding a first predetermined value a plurality of times within a predetermined period in a case in which the capacitance detector is in a standby state and no contact with the living body is detected,
   the increment in the capacitance is a difference between a capacitance value detected in a previous detection and a capacitance value detected in a current detection among capacitance values repeatedly detected by the capacitance detector, the difference being calculated by subtracting the capacitance value detected in the previous detection from the detected capacitance value detected in the current detection, the difference between the increments in the capacitance being calculated by subtracting an increment in the capacitance obtained in a previous detection from an increment in the capacitance obtained in a current detection.

10. The electrostatic input device according to claim 9, wherein
    the controller includes a counter configured to increment a value in response to the difference reaching or exceeding the first predetermined value, and
    the controller is configured to transition the capacitance detector to the activated state in response to a count value of the counter reaching a predetermined count value within the predetermined period, the predetermined count value corresponding to the predetermined number of times.

11. The electrostatic input device according to claim 9, wherein
    the controller is configured to transition the capacitance detector to the activated state in response to the difference reaching or exceeding the first predetermined value in conjunction with the difference that reaches or exceeds the first predetermined value increasing over time.

12. The electrostatic input device according to claim 9, wherein
the controller is configured to increase the first predetermined value stepwise within the predetermined period.

13. An electrostatic input device, comprising:
a capacitance detector that is disposed at an operation part to be operated by a living body, and is configured to detect capacitance; and
a controller that is formed of an integrated circuit, and is configured to transition the capacitance detector to an activated state in response to an increment in the capacitance detected by the capacitance detector reaching or exceeding a first predetermined value a predetermined number of times within a predetermined period in a case in which the capacitance detector is in a standby state and no contact with the living body is detected, wherein
the controller includes a counter configured to increment a value in response to the increment in the capacitance reaching or exceeding the first predetermined value, and
the controller is configured to transition the capacitance detector to the activated state in response to a count value of the counter reaching a predetermined count value within the predetermined period, the predetermined count value corresponding to the predetermined number of times.

* * * * *